(12) United States Patent
Kito et al.

(10) Patent No.: US 10,438,707 B2
(45) Date of Patent: Oct. 8, 2019

(54) NUCLEAR POWER PLANT THAT CAN AUTOMATICALLY CLOSE A STEAM SAFETY RELIEF VALVE UPON DETERMINATION OF EXHAUST PIPE LEAKAGE

(71) Applicant: Hitachi—GE Nuclear Energy, Ltd., Hitachi-shi, Ibaraki (JP)

(72) Inventors: Kazuaki Kito, Tokyo (JP); Takahisa Matsuzaki, Tokyo (JP); Tomohiko Ikegawa, Tokyo (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 388 days.

(21) Appl. No.: 15/420,407

(22) Filed: Jan. 31, 2017

(65) Prior Publication Data

US 2017/0229196 A1 Aug. 10, 2017

(30) Foreign Application Priority Data

Feb. 5, 2016 (JP) .................................. 2016-021324

(51) Int. Cl.
*G21C 9/004* (2006.01)
*G21C 15/18* (2006.01)

(52) U.S. Cl.
CPC .............. *G21C 9/004* (2013.01); *G21C 15/18* (2013.01); *Y02E 30/40* (2013.01)

(58) Field of Classification Search
CPC ......... G21C 9/004; G21C 15/18; G21C 9/012

USPC .......................................................... 376/283
See application file for complete search history.

(56) References Cited

U.S. PATENT DOCUMENTS

| 5,896,431 A * | 4/1999 | Cheung .................. G21C 15/18 |
| | | 376/283 |
| 2013/0094623 A1* | 4/2013 | Chung .................... G21C 9/004 |
| | | 376/283 |

FOREIGN PATENT DOCUMENTS

| JP | 59-174788 A | 10/1984 |
| JP | 60-117195 A | 6/1985 |
| JP | 62-100696 A | 5/1987 |
| JP | 63-175799 A | 7/1988 |

* cited by examiner

*Primary Examiner* — Jack W Keith
*Assistant Examiner* — Daniel Wasil
(74) *Attorney, Agent, or Firm* — Crowell & Moring LLP

(57) ABSTRACT

An atomic power plant is provided including a primary containment vessel (PCV) 1, a reactor pressure vessel (RPV) 3, a main steam line 4, two steam safety relief valves (SRVs) 6, a pressure suppression pool (S/P) 8, an SRV exhaust pipe 9 which is connected to a quencher 10, a temperature measuring instrument 12 which measures a temperature inside the quencher 10, an SRV controller 13 which controls opening and closing of the SRVs 6. After a lapse of predetermined time from when the SRV 6 is opened, in a case where it is determined that a temperature detected by the temperature measuring instrument 12 is equal to or smaller than a predetermined threshold value, the SRV controller 13 causes the SRV 6 to which the temperature measuring instrument 12 detecting the temperature leads, to be closed and to be prohibited from being opened.

2 Claims, 11 Drawing Sheets

[Fig. 1]
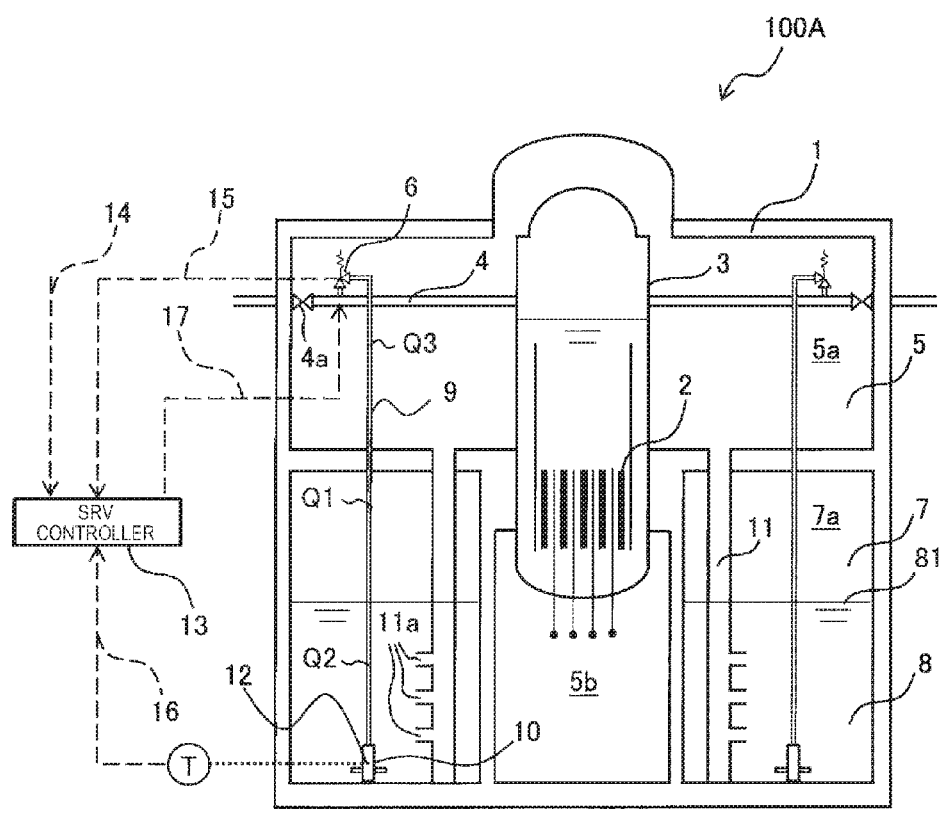

[Fig. 2]
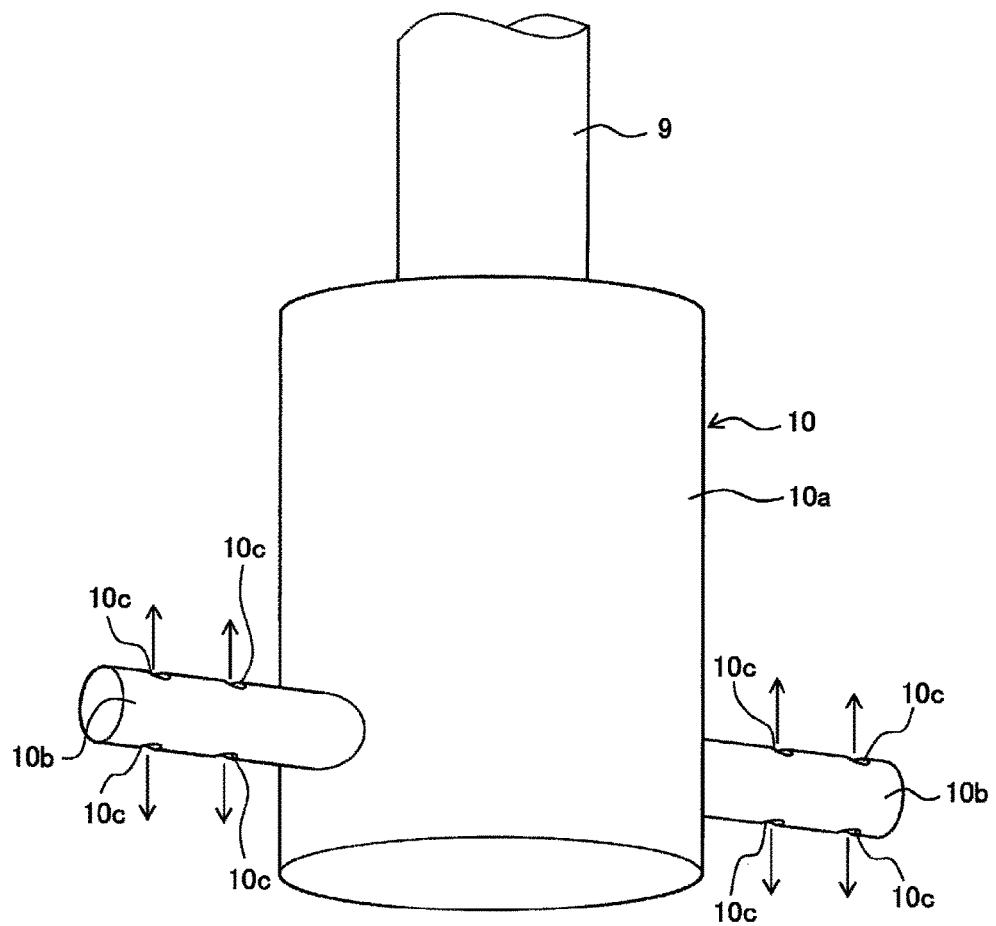

[Fig. 3]
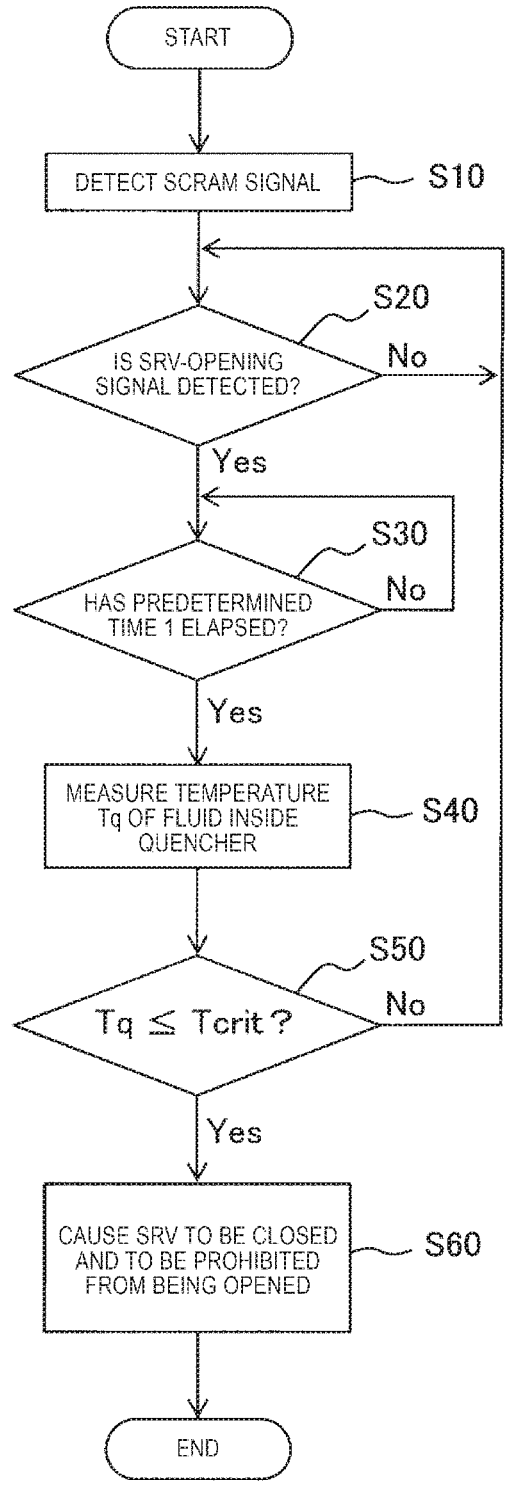

[Fig. 4]
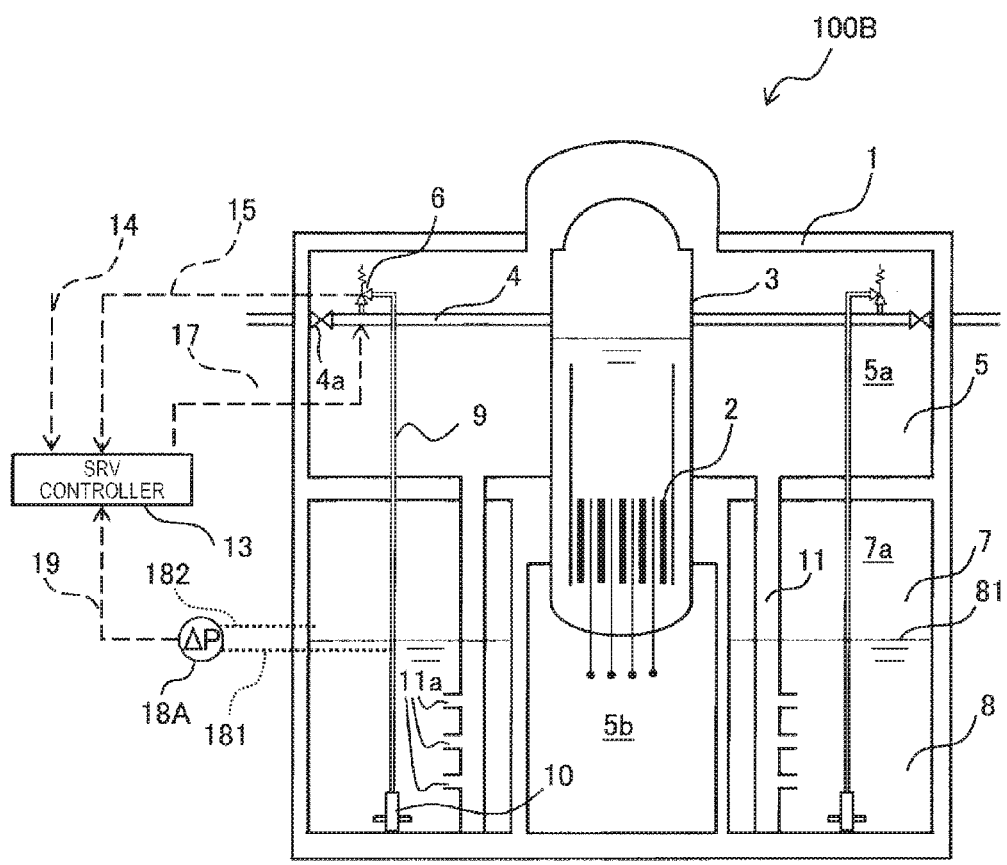

[Fig. 5]
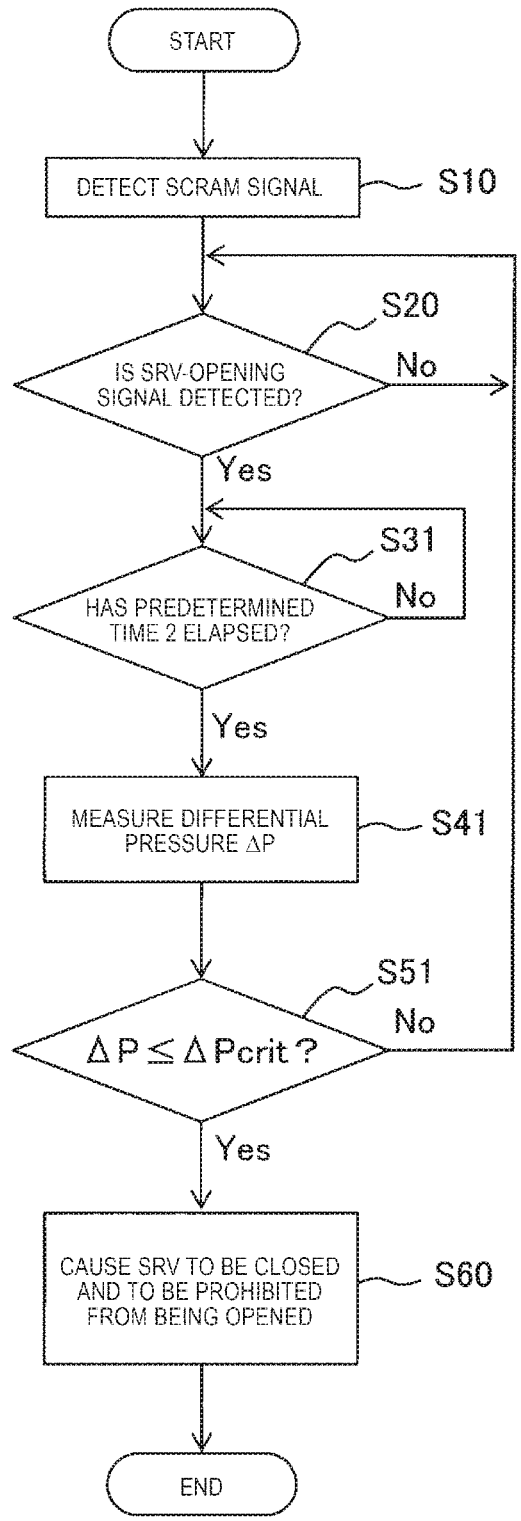

[Fig. 6]
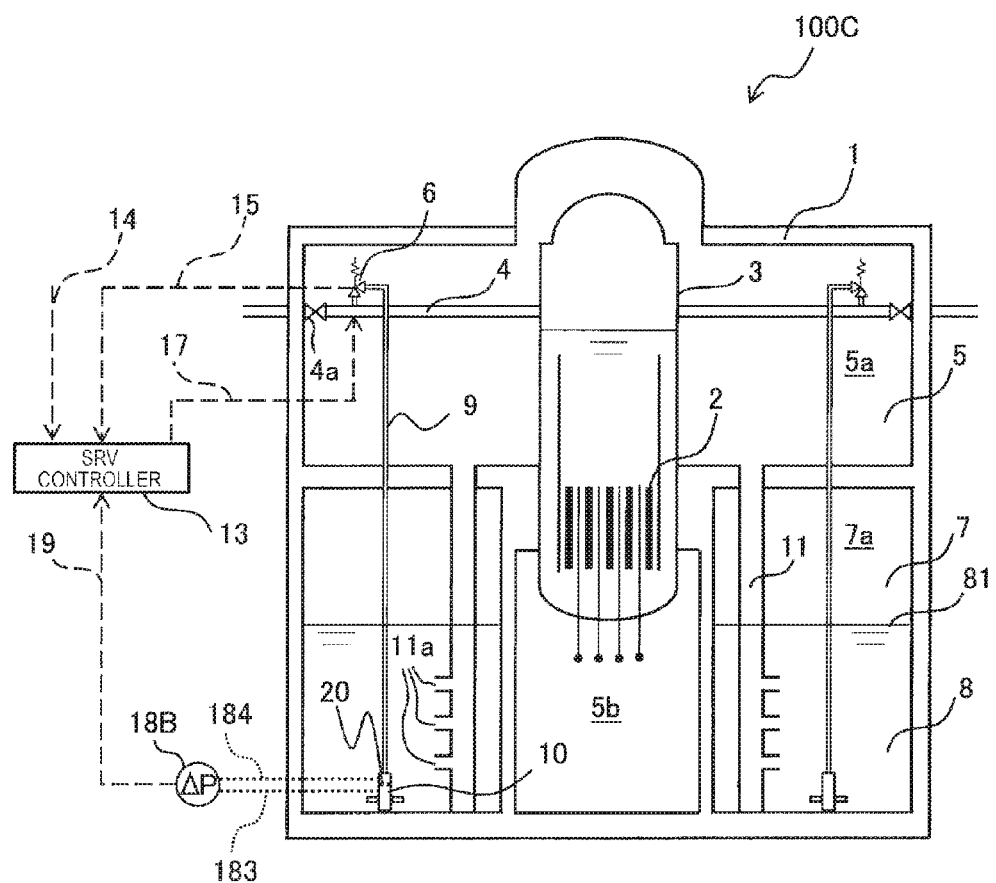

[Fig. 7]
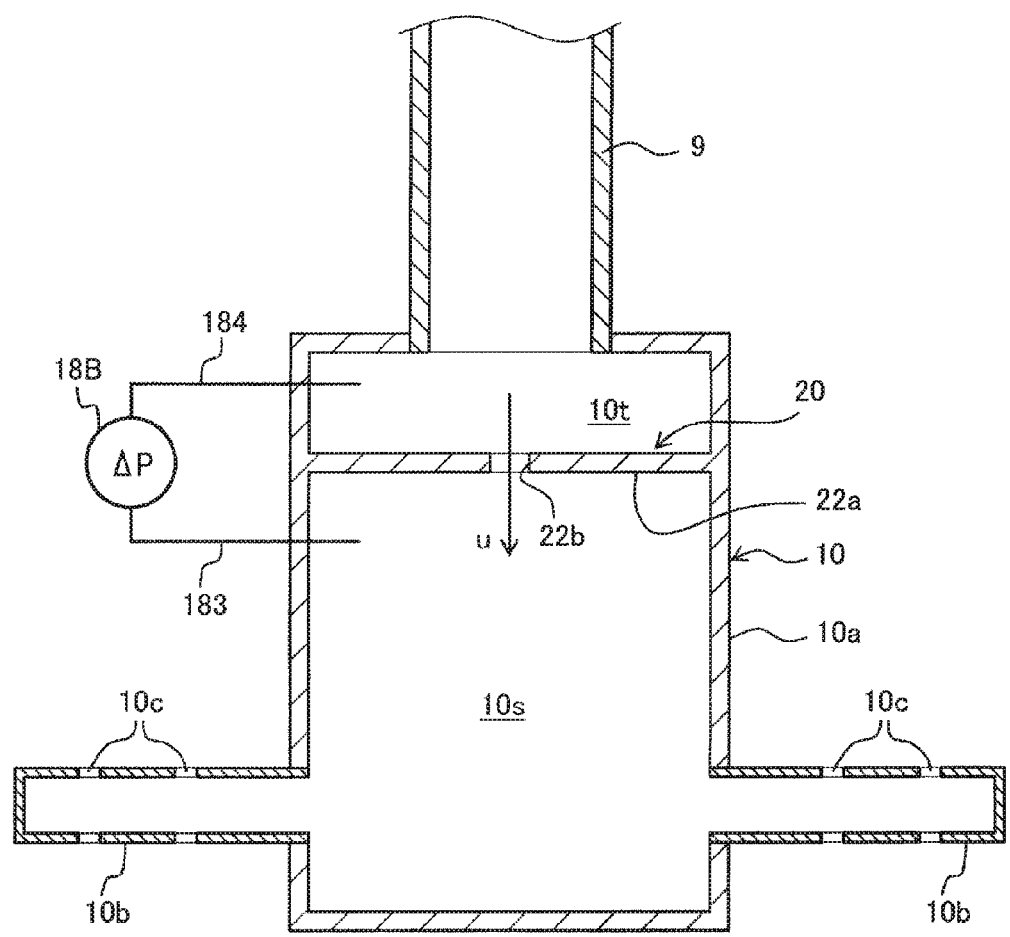

[Fig. 8]
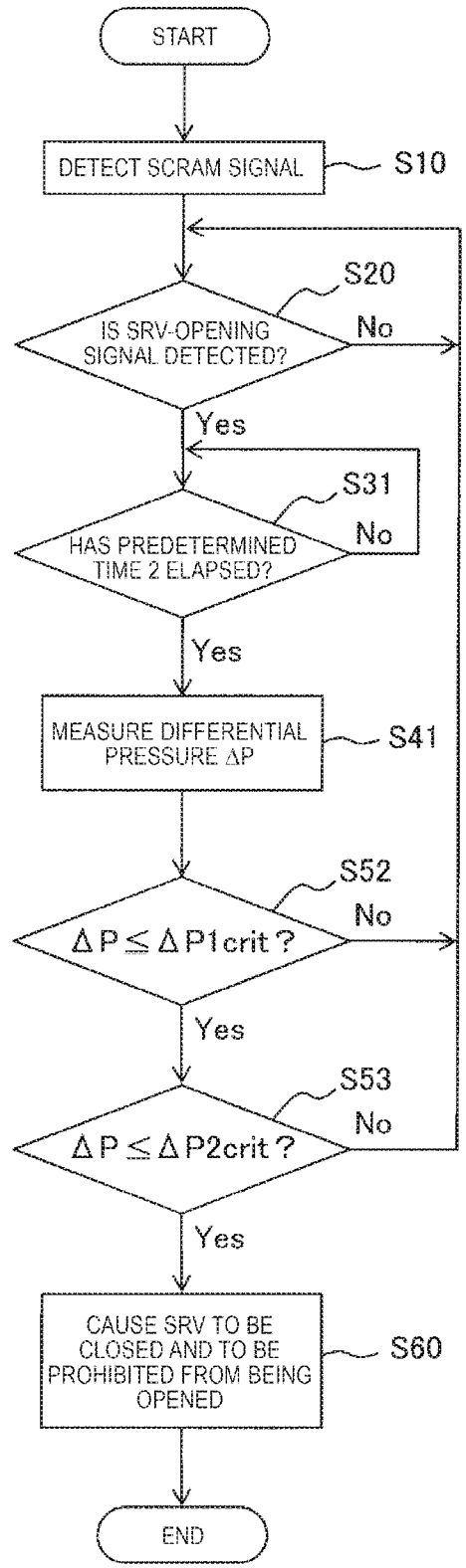

[Fig. 9]
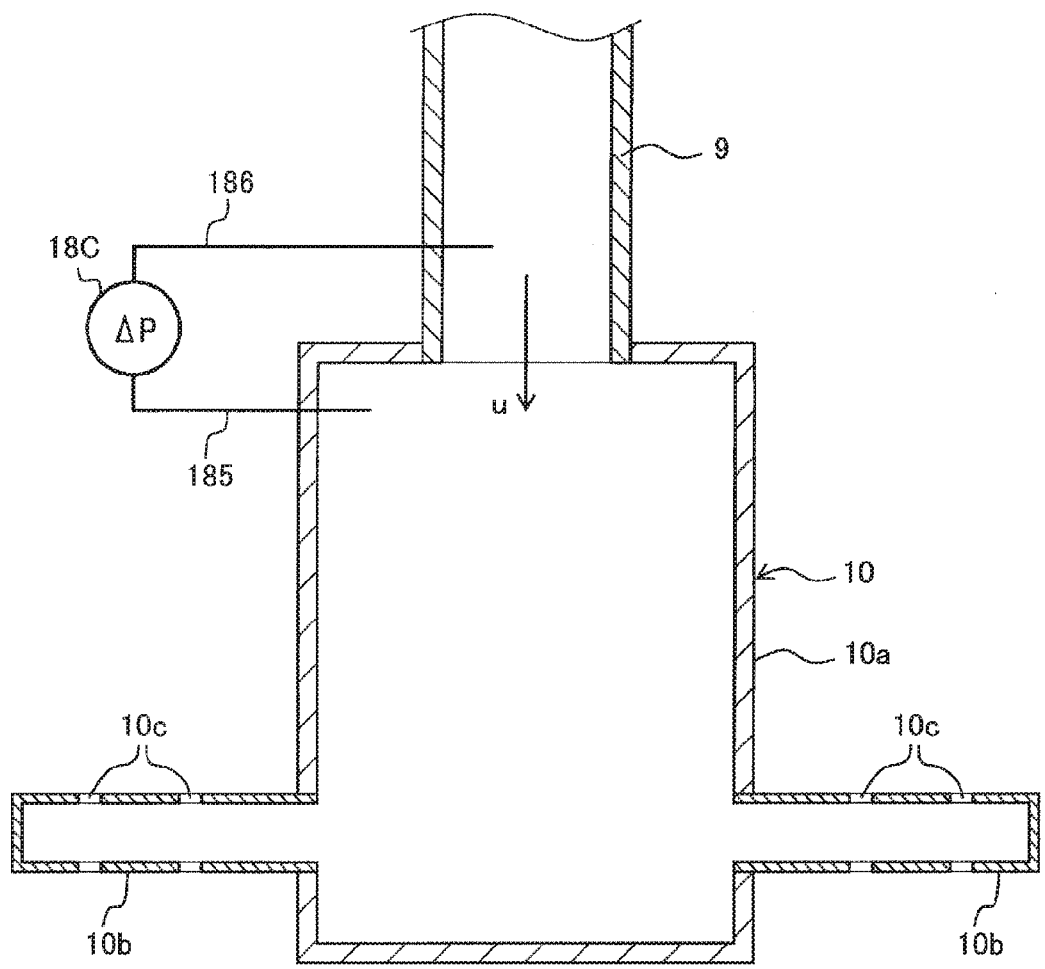

[Fig. 10]
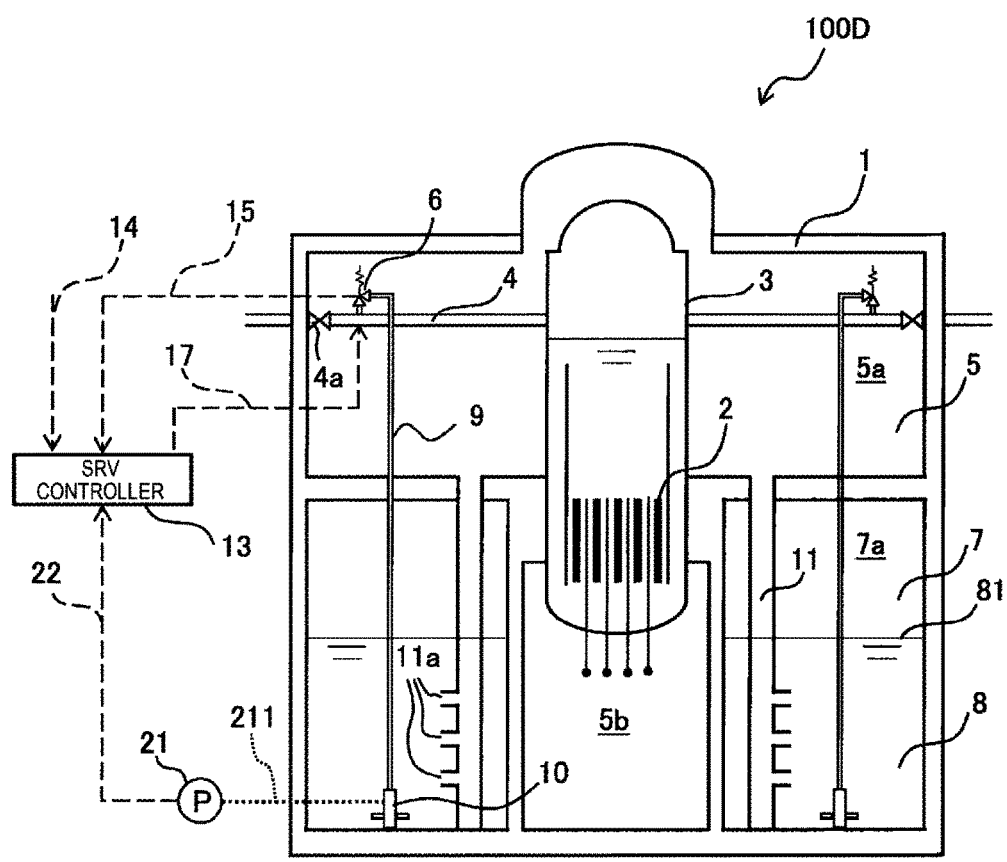

[Fig. 11]
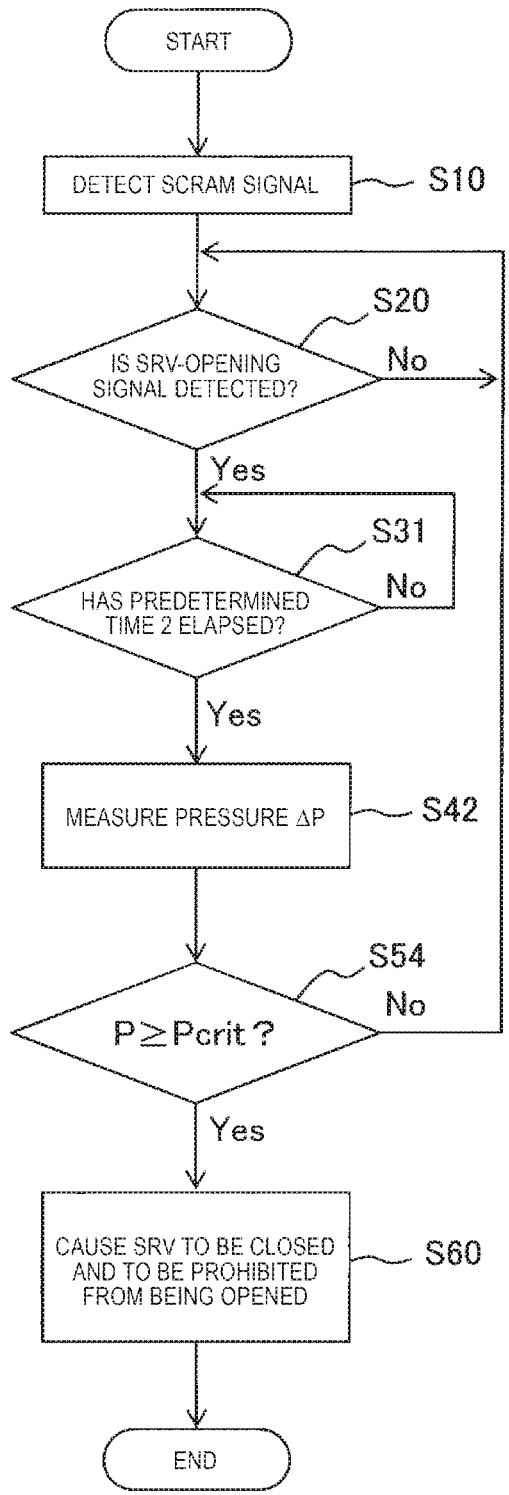

NUCLEAR POWER PLANT THAT CAN AUTOMATICALLY CLOSE A STEAM SAFETY RELIEF VALVE UPON DETERMINATION OF EXHAUST PIPE LEAKAGE

TECHNICAL FIELD

The present invention relates to an atomic power plant.

BACKGROUND ART

In an atomic power plant, decay heat is generated in a core even after a reactor stops, and steam is generated due to the heat. For example, in a boiling water-type reactor (hereinafter, will be referred to as BWR), in a case where an abnormal situation occurs in the reactor and the pressure in the reactor rises, the generated steam is partially caused to pass through a steam safety relief valve (hereinafter, will be referred to as SRV) and to be discharged to a pressure suppression pool (hereinafter, will be referred to as S/P) inside a wetwell (hereinafter, will be referred to as W/W) which is apart of a primary containment vessel (hereinafter, will be referred to as PCV), and the steam is condensed therein. In the BWR having such a mechanism, even a relatively small PCV can efficiently eliminate (condense) the steam generated due to the decay heat, and a rise of the pressure in the PCV is relaxed such that the pressure can be restrained from excessively rising.

In a general BWR, the SRV is installed on a main steam line inside a drywell (hereinafter, will be referred to as D/W) which is a part of the PCV. Piping (hereinafter, will be referred to as SRV exhaust pipe) leading from the SRV to the S/P passes through the D/W and passes through a W/W space (upper space of the S/P). Thereafter, the piping communicates with the inside of the S/P. Generally, a structural material which is called a quencher is connected to the terminal end of the SRV exhaust pipe and steam is dispersed and is discharged to the inside of the S/P such that the steam can be efficiently condensed inside the S/P. However, on the assumption of a case where a steam leakage from the SRV exhaust pipe occurs in the W/W space, there is a possibility that steam discharged from the SRV is not discharged to the inside of the S/P and the function of the S/P condensing steam is degraded. As a result thereof, there is a possibility that the rate of rise of the pressure in the PCV increases and countermeasures to increase the capacity of an instrument restraining the pressure of the PCV from rising are required.

In addition, in a case where steam leaks from the SRV exhaust pipe at a place other than the W/W space, for example, when a leakage occurs in the D/W, the leaked steam passes through a vent pipe and flows into the S/P, thereby being condensed. In addition, for example, when steam leaks below the water level of the S/P, the leaked steam is condensed due to S/P water around thereof. Therefore, even though the influence is small compared to a case where a leakage occurs in the W/W space, it is desirable that steam leakages at these places can also be excluded.

Normally, multiple systems of SRVs are installed. In consideration of a case where apart of the SRVs fails to be opened, a number of SRVs sufficient to restrain the pressure in a reactor from rising are installed.

In order to prevent the above-described steam leakage in the W/W space, a configuration having double SRV exhaust pipes in the W/W space has been proposed (refer to PTL 1). In addition, in order to restrain a local rise of the temperature of the S/P water caused due to steam which is released inside the S/P from the SRV, or in order to efficiently condense steam released inside the S/P, a configuration of controlling the SRV to be opened by using the temperature of the S/P water has been proposed (refer to PTL 2 and PTL 3). In addition, in order to retain the soundness of the PCV, a configuration of controlling opening of the SRV in a case where the temperature of the S/P water becomes equal to or higher than a certain temperature has been proposed (refer to PTL 4).

CITATION LIST

Patent Literature

PTL 1: JP-A-59-174788
PTL 2: JP-A-60-117195
PTL 3: JP-A-63-175799
PTL 4: JP-A-62-100696

SUMMARY OF INVENTION

Technical Problem

However, in PTL 1, although the pressure in a PCV can be restrained from rising by providing double SRV exhaust pipes, large-scale construction is required in order to change the structure of an existing reactor as above, and thus, the cost thereof increases. In addition, normally, in order to absorb heat expansion and to avoid interference with other structural materials, multiple curves are present in an SRV exhaust pipe. However, the temperature of the SRV exhaust pipe passing through the inside becomes high during an operation of an SRV. In contrast, the double pipes covering the outside are maintained in a low temperature state. Accordingly, there is a difference between the amounts of heat expansion of pipes. Thus, a structure of absorbing the difference of heat expansion is required.

In addition, in PTL 2 and PTL 3, opening and closing of the SRV can be controlled. However, it is not possible to detect a steam leakage from the SRV exhaust pipe and to control opening and closing of the SRV in response to a received result of the detection.

The present invention has been made in order to solve the above-described problems, and an object thereof is to provide an atomic power plant which can be applied to reactors including existing reactors through a simple method and in which a pressure in a primary containment vessel can be restrained from excessively rising in a case where a steam leakage from an exhaust pipe of a steam safety relief valve occurs.

Solution to Problem

The present invention includes a primary containment vessel, a reactor pressure vessel which is disposed inside the primary containment vessel and internally accommodates a core, a main steam line which is connected to the reactor pressure vessel and leads to a turbine, at least two or more steam safety relief valves which are independently connected to the main steam line, a pressure suppression pool which is provided inside the primary containment vessel, an exhaust pipe in which one end is connected to each of the steam safety relief valves and the other end is open or is connected to the quencher below a water level of the pressure suppression pool, a temperature measuring instrument which measures a temperature inside the exhaust pipe or inside the quencher below the water level of the pressure suppression pool, and a control unit which controls opening and closing of the steam safety relief valve. After a lapse of predetermined time from when the steam safety relief valve is opened, in a case where it is determined that a temperature detected by the temperature measuring instrument is equal to or smaller than a predetermined threshold value, the control unit causes the steam safety relief valve to which the temperature measuring instrument detecting the temperature equal to or smaller than the predetermined threshold value leads, to be closed and to be prohibited from being opened.

Advantageous Effects of Invention

According to the present embodiment, it is possible to provide the atomic power plant which can be applied to reactors including existing reactors through a simple method and in which a pressure in the primary containment vessel can be restrained from excessively rising in a case where a steam leakage from the exhaust pipe of the steam safety relief valve occurs.

BRIEF DESCRIPTION OF DRAWINGS

FIG. 1 is a schematic configuration diagram illustrating an atomic power plant of a first embodiment.

FIG. 2 is an enlarged view of a quencher.

FIG. 3 is a flow chart illustrating an operation of the atomic power plant of the first embodiment.

FIG. 4 is a schematic configuration diagram illustrating an atomic power plant of a second embodiment.

FIG. 5 is a flow chart illustrating an operation of the atomic power plant of the second embodiment.

FIG. 6 is a schematic configuration diagram illustrating an atomic power plant of a third embodiment.

FIG. 7 is a partially enlarged cross-sectional view of FIG. 6.

FIG. 8 is a flow chart illustrating an operation of the atomic power plant of the third embodiment.

FIG. 9 is a cross-sectional view in a case of measuring a differential pressure in a configuration having no orifice.

FIG. 10 is a schematic configuration diagram illustrating an atomic power plant of a fourth embodiment.

FIG. 11 is a flowchart illustrating an operation of the atomic power plant of the fourth embodiment.

DESCRIPTION OF EMBODIMENTS

Hereinafter, forms for executing the present invention (hereinafter, will be referred to as "embodiment") will be described in detail suitably with reference to the drawings.

First Embodiment

FIG. 1 is a schematic configuration diagram illustrating an atomic power plant of a first embodiment, and FIG. 2 is an enlarged view of a quencher. The first embodiment corresponds to the configuration of Claim 1 in Claims.

As illustrated in FIG. 1, an atomic power plant 100A is an example in which a primary containment vessel 1 (hereinafter, will be referred to as PCV) is applied to an advanced BWR (hereinafter, will be referred to as ABWR), and the atomic power plant 100A has a system configuration as follows.

The atomic power plant 100A includes the PCV 1, a reactor pressure vessel 3 (hereinafter, will be referred to as RPV) which is disposed inside the PCV 1 and internally accommodates a core 2, and a main steam line 4 which is connected to the RPV 3 and leads to a turbine (not illustrated). In addition, the atomic power plant 100A includes a steam safety relief valve 6 (hereinafter, will be referred to as SRV) which is independently connected to the main steam line 4, a pressure suppression pool 8 (hereinafter, will be referred to as S/P) which is provided inside the PCV 1, and an SRV exhaust pipe 9 in which one end is connected to the SRV 6 and the other end is connected to a quencher 10 below an S/P water level 81 (below water level). In addition, the atomic power plant 100A includes a temperature measuring instrument 12 which measures a temperature inside the quencher 10 below the S/P water level 81, and an SRV controller 13 (control unit) which controls opening and closing of the SRV 6. For the convenience of description, FIG. 1 illustrates only two systems of SRV 6. However, actually, more systems are installed. In addition, in FIG. 1, for the convenience of description, the SRV controller 13 and the temperature measuring instrument 12 are depicted in only the SRV 6 illustrated on the left side. However, a controlling function may be installed in multiple SRVs.

The main steam line 4 sending steam generated inside the RPV 3 to the turbine (not illustrated) is connected to the RPV 3. The main steam line 4 is installed in a region which is called a drywell (hereinafter, will be referred to as D/W) 5 inside the PCV 1, and the SRV 6 is connected to the main line 4. In addition, the main steam line 4 penetrates the PCV 1 and extends outward from the RPV 3. The main steam line 4 includes a shutoff valve 4a which shuts off a flow channel between the inside and the outside of the PCV 1.

Inside the PCV 1, there are provided a region referred to as D/W 5, and a region referred to as wetwell 7 (hereinafter, will be referred to as W/W). The W/W 7 is a region in which pool water is stored. A pool inside the W/W 7 is called a pressure suppression pool (S/P) 8. In FIG. 1, the reference sign 81 indicates a water level position of the S/P 8. In addition, in FIG. 1, the D/W 5 is divisibly called depending on the location such that a region above the W/W 7 is sometimes called an upper D/W 5a and a region below the RPV 3 next to the W/W is sometimes called a lower D/W 5b. In addition, a region of the W/W 7 above the S/P 8 is sometimes called a W/W space 7a.

The SRV 6 is a valve which is opened in order to lower the pressure in a case where the pressure inside the RPV 3 and the main steam line 4 excessively rises. The SRV 6 has a function of a relief valve which is caused to be opened by the SRV controller 13 and a function of a safety valve which is opened by spring force when the pressure exceeds a set pressure. When the SRV 6 is opened, steam inside the RPV 3 and the main steam line 4 is released, and then, the pressure inside the RPV 3 can be lowered.

One end of the SRV exhaust pipe 9 on the upstream side is connected to the SRV 6, and the other end extends below the water level 81 of the S/P 8. In addition, in the ABWR, the SRV exhaust pipe 9 enters the W/W space 7a after passing through the D/W 5 (upper D/W 5a), and the SRV exhaust pipe 9 is connected to an instrument called the quencher 10 which is installed at the bottom inside the S/P 8. The installation position of the quencher 10 is not necessarily limited to the bottom of the S/P 8. The installation position may be a position separated upward from the bottom of the pool as long as the position is inside the S/P 8.

The quencher 10 is an instrument which is installed at the bottom of the S/P 8 and efficiently condenses steam inside the S/P 8. Steam released through the SRV 6 passes through the SRV exhaust pipe 9 and is eventually released from the quencher 10 to the inside of the S/P 8, thereby being condensed due to the pool water. As the steam is condensed in the S/P 8 and is caused to be water that is liquid, the volume of the steam is drastically reduced. Therefore, even when the steam is released to the PCV 1 side, the pressure in the PCV 1 can be restrained from rising.

As illustrated in FIG. 2, the quencher 10 is connected to the tip (end portion) of the SRV exhaust pipe 9 and is configured to include a cylinder 10a having a diameter greater than that of the SRV exhaust pipe 9, and a branch pipe 10b protruding outward from the circumferential surface of the cylinder 10a. Multiple holes 10c are formed in the branch pipe 10b. In this manner, as steam is discharged through the holes 10c as small air bubbles, the steam can be easily condensed inside the S/P 8. In FIG. 2, description is given by illustrating a case including two branch pipes 10b. However, the branch pipe 10b is not limited to two and may be one, or three or more.

Returning to FIG. 1, in a case where the pressure inside the RPV 3 or the main steam line 4 excessively rises, the SRV controller 13 causes the SRV 6 to be opened. As steam is released inside the S/P 8 through the SRV exhaust pipe 9 and the quencher 10 and is condensed therein, the pressure inside the PCV 1 hardly rises and the pressure inside the RPV 3 or the main steam line 4 can be reduced.

In addition, the atomic power plant 100A includes a vent pipe 11 which is connected to the D/W 5 (upper D/W 5a). The vent pipe 11 extends toward the bottom surface of the S/P 8 from the upper D/W 5a, and multiple steam discharge holes 11a through which steam is discharged to the inside of the S/P 8 are formed in the vent pipe 11.

The SRV controller 13 includes a central processing unit (CPU), a memory, an interface circuit, and the like. The SRV controller 13 controls opening and closing of the SRV 6 in accordance with a control program stored in the memory (ROM). In addition, a scram signal line 14 into which a scram signal is input from a plant control system (not illustrated) controlling the plant in its entirety, an SRV-open signal line 15 into which an SRV-open signal is input from the SRV 6, and a temperature measurement value signal line 16 into which a temperature measurement value signal is input from the temperature measuring instrument 12 are connected to the SRV controller 13. The SRV-open signal is a signal indicating a state whether or not the SRV 6 is opened. In addition, an SRV-close signal line 17 which outputs an SRV-close signal for closing the SRV 6 is connected to the SRV controller 13. An SRV-close signal for closing the SRV 6 may be output from the plant control system (not illustrated) instead of the SRV controller 13.

Incidentally, on the assumption of a case where steam leaks from the SRV exhaust pipe 9 in the W/W space 7a (above the water level 81 of the S/P 8), the steam released through a leakage port Q1 (refer to FIG. 1) is only condensed at the water level 81 of the S/P 8. Therefore, compared to a case where steam is released in the water of the S/P 8, condensing efficiency of steam is deteriorated. As a result thereof, in a case where steam is released from the SRV 6, the rate of rise of the pressure inside the PCV 1 increases. When the pressure inside the PCV 1 excessively rises, in order to prevent over-pressurization breakage of the PCV 1, an additional operation for lowering the pressure inside the PCV 1, such as releasing gas inside the PCV 1 into the atmosphere and operating spraying for condensing steam inside the PCV 1, is required. In a case where the SRV exhaust pipe 9 is ruptured inside the S/P 8 (refer to the reference sign Q2 in FIG. 1), since steam is released in the water, the steam is condensed due to the pool water of the S/P 8. In addition, in a case where the SRV exhaust pipe 9 is ruptured inside the D/W 5 (refer to the reference sign Q3 in FIG. 1), leaked steam can be condensed inside the S/P 8 through the vent pipe 11 leading to the S/P 8 from the D/W 5. Therefore, even though the influence is small compared to a case where a leakage occurs in the W/W space 7a, it is desirable that steam leakages at these places can also be excluded.

In the present embodiment, the above-described problems are solved. The temperature measuring instrument 12 is installed inside the quencher 10 provided below the S/P water level 81, and a steam leakage from the SRV exhaust pipe 9 is detected based on the measured temperature. The present embodiment is characterized by having a controlling function such that the leaking SRV 6 is closed and is prohibited from being opened in a case where a leakage is detected. The temperature measuring instrument 12 in FIG. 1 indicates the temperature measuring position, and the entirety of a portion including the sign "T" illustrated outside the PCV 1 is the temperature measuring instrument. The installation position of the temperature measuring instrument 12 is set to be inside the quencher 10 (or inside the SRV exhaust pipe 9 below the S/P water level 81) because it is particularly severe from the viewpoint of the rate of rise of the pressure in the PCV 1 in a case where steam leaks from the SRV exhaust pipe 9 in the W/W space 7a (above the S/P water level 81).

Due to the provided controlling function, in a case where if steam leaks from the SRV exhaust pipe 9, since the SRV 6 connected to the leaking SRV exhaust pipe 9 is caused not to be opened, steam can be prevented from leaking and the pressure in the PCV 1 can be restrained from rising. Normally, multiple systems of SRV 6 are installed. In consideration of a case where apart of the SRVs 6 fails to be opened, a number of SRVs 6 sufficient to restrain the pressure in a reactor from rising are installed. In addition, normally, since the SRV 6 is designed to have a capacity such that the whole quantity of steam can be released even at a steam generation rate during a normal operation, in a case where an output of the reactor is reduced due to a scram or the like, the margin of the capacity of the SRV 6 further increases. Thus, even in a case where a leakage is detected in one of the multiple SRVs 6 or a part of the SRVs 6, and the SRVs 6 are caused not to be opened, the pressure in the reactor can be prevented from excessively rising.

FIG. 3 is a flowchart illustrating an operation of the atomic power plant of the first embodiment.

As illustrated in FIG. 3, in Step S10, this control logic starts when the SRV controller 13 receives a scram signal of the reactor from the scram signal line 14 (refer to FIG. 1). However, the scram signal is not essential to controlling. The scram signal is not necessary in a case where there is a margin for the number of SRVs 6 or in a case where the probability of a leakage from the SRV exhaust pipe 9 is sufficiently small, that is, in a case where the possibility of leakages from the multiple SRV exhaust pipes 9 can be ignored. In addition, instead of the scram signal, the maximum number of SRVs 6, that is, the SRVs 6 closed and prohibited from being opened due to controlling of the present invention may be set to a suitable value so as to cope with the margin for the number of SRVs 6.

In Step S20, the SRV controller 13 determines whether or not an SRV-open signal indicating the presence of an opened SRV 6 is detected. In a case where it is determined that the SRV 6 is not opened (No in S20), the SRV controller 13 repeats the processing of Step S20. In a case where it is determined that the SRV 6 is opened (Yes in S20), the procedure proceeds to Step S30. In other words, in a case where a certain SRV 6 (one SRV 6 or a part of the SRVs) is opened, the SRV controller 13 receives the SRV-open signal from the SRV-open signal line 15.

In Step S30, the SRV controller 13 determines whether or not a predetermined time 1 has elapsed. The predetermined time 1 is suitably set in accordance with the length of the SRV exhaust pipe 9, and as the SRV exhaust pipe 9 is elongated, the predetermined time 1 is set to be longer. For example, the predetermined time 1 is set to 10 seconds. The lapse of the predetermined time 1 is determined in such a manner because when the SRV 6 is opened, even though steam is released from the SRV 6 to the SRV exhaust pipe 9, a time delay occurs until the steam arrives at the position where the temperature measuring instrument 12 is installed and the arrival is detected by the temperature measuring instrument 12. In a case where it is determined that the predetermined time 1 has not elapsed (No in S30), the SRV controller 13 repeats the processing of Step S30. In a case where it is determined that the predetermined time 1 has elapsed (Yes in S30), the procedure proceeds to Step S40.

In Step S40, the SRV controller 13 measures a temperature Tq of a fluid flowing inside the quencher 10 and receives the measured temperature Tq via the temperature measurement value signal line 16.

In Step S50, the SRV controller 13 determines whether or not the temperature Tq is equal to or smaller than Tcrit (predetermined temperature). In a case where it is determined that the temperature Tq is not equal to or smaller than the Tcrit (No in S50), the SRV controller 13 returns to Step S20. In a case where it is determined that the temperature Tq is equal to or smaller than the Tcrit (Yes in S50), the procedure proceeds to Step S60. The procedure returns to Step S20 when the temperature Tq is not equal to or smaller than the Tcrit (No in S50) because the SRV 6 is sometimes closed while being under such a condition.

In other words, the inside of the quencher 10 (or the inside of the SRV exhaust pipe 9 below the S/P water level 81) is filled with water of the S/P 8 until the SRV 6 is opened. When the SRV 6 is opened and steam is released, the water inside the SRV exhaust pipe 9 and inside the quencher 10 is extruded to the S/P 8 by the steam, and the inside of the SRV exhaust pipe 9 and the inside of the quencher 10 are filled with the steam. Therefore, if there is no steam leakage from the SRV exhaust pipe 9, the temperature inside the quencher 10 rises. Meanwhile, in circumstances where an amount of steam leaks from the SRV exhaust pipe 9 such that steam does not reach the S/P 8, water remains inside the quencher 10. Accordingly, the temperature hardly rises, or even if the temperature rises, the rise is small. Thus, when the temperature measuring instrument 12 is installed inside the quencher 10, a steam leakage from the SRV exhaust pipe 9 can be detected.

Specifically, in a case where a temperature measured by the temperature measuring instrument 12 is equal to or smaller than the predetermined temperature Tcrit (Yes in S50), it is determined that there is a steam leakage. For example, the value of the Tcrit is favorably set to 100° C. which is the saturation temperature under the atmospheric pressure. In accordance with the design of the reactor, the maximum temperature of the S/P 8, and the maximum pressure in the PCV 1 are set. In a case where the maximum temperature of the S/P 8 is set, the value of the Tcrit may be set to a temperature higher than the temperature thereof. In a case where the maximum pressure in the PCV 1 is set, the value may be set to the saturation temperature under the maximum pressure in the PCV 1.

In Step S60, the SRV controller 13 performs controlling such that the SRV 6 is closed and performs controlling such that the closed SRV 6 is not opened thereafter (prohibited from being opened).

In this manner, in a case where it is determined that there is a steam leakage in the SRV exhaust pipe 9, based on the result obtained by the temperature measuring instrument 12, an SRV-close signal for closing the SRV 6 and an SRV-open prohibiting signal for prohibiting the SRV 6 from being opened signal are transmitted to the SRV-close signal line 17, and controlling is performed such that the SRV 6 having a steam leakage is not opened.

Regarding the SRV 6, multiple systems are installed. For example, in the SRVs 6, the set pressures for being opened are different from each other, or characteristics such as the presence or absence of a function of automatic decompression for reducing the pressure inside the RPV 3 are different from each other. In this manner, since the characteristics are different from each other, the priority in a case of considering the object of the present invention also varies. For example, after the reactor stops (scrams), the steam generation rate is reduced compared to the time of a normal operation. Therefore, basically, only the SRV 6 in multiple SRVs 6 having a low set pressure for being opened is opened. The priority of the SRV 6 having a high opening frequency becomes high. In addition, since there may be a case where the SRV 6 having the function of automatic decompression for reducing the pressure inside the RPV 3 continuously discharges steam inside the RPV 3, the priority becomes high. In this manner, the present embodiment may be applied to only the SRV having the high priority.

The first embodiment described above includes the PCV 1, the RPV 3, the main steam line 4, at least two or more SRVs 6, the S/P 8, the SRV exhaust pipe 9 in which one end is connected to each of the SRVs 6 and the other end is connected to the quencher 10 below the S/P water level 81, the temperature measuring instrument 12 which measures a temperature inside the quencher 10, and the SRV controller 13 which controls opening and closing of the SRV 6. After a lapse of the predetermined time 1 from when the SRV 6 is opened (Yes in S20, S30), in a case where it is determined that a temperature detected by the temperature measuring instrument 12 is equal to or smaller than the predetermined threshold value (Tcrit) (Yes in S40, S50), the SRV controller 13 causes the SRV 6 to which the temperature measuring instrument 12 detecting the temperature equal to or smaller than the predetermined threshold value leads, to be closed and to be prohibited from being opened. Accordingly, it is favorable when the temperature measuring instrument 12 is provided only inside the quencher 10. Therefore, the embodiment can be applied to reactors including existing reactors through a simple method. In addition, in a case where an occurrence of a steam leakage from the SRV exhaust pipe 9 is detected, the SRV 6 of the leaking SRV exhaust pipe 9 is closed and is prohibited from being opened. Accordingly, the pressure in the RPV 3 can be restrained from excessively rising.

Second Embodiment

FIG. 4 is a schematic configuration diagram illustrating an atomic power plant of a second embodiment. The same reference signs will be applied to configurations similar to those of the first embodiment, and overlapping description will be omitted (will be similar in the third embodiment and thereafter). In addition, the second embodiment corresponds to the configuration of Claim 2 in Claims.

As illustrated in FIG. 4, an atomic power plant 100B of the second embodiment is different from that of the first embodiment in that the measurement means for detecting a steam leakage from the SRV exhaust pipe 9 is changed.

The atomic power plant 100B includes a differential pressure measuring instrument 18A (in FIG. 4, indicated with the sign "ΔP") as means for detecting a steam leakage from the SRV exhaust pipe 9. A signal measured by the differential pressure measuring instrument 18A is input to the SRV controller 13 from a differential pressure measurement value signal line 19. Two differential pressure conduits (first differential pressure conduit 181 and second differential pressure conduit 182) are connected to the differential pressure measuring instrument 18A. The first differential pressure conduit 181 is connected to the inside of the SRV exhaust pipe 9 below the S/P water level 81. The second differential pressure conduit 182 is connected to the W/W space 7a. The first differential pressure conduit 181 may be connected to the inside of the quencher 10 instead of the inside of the SRV exhaust pipe 9 below the S/P water level 81, and the second differential pressure conduit 182 may be present inside the D/W 5 or the S/P 8 instead of the W/W 7.

In a case where there is no steam leakage from the SRV exhaust pipe 9, steam released from the SRV 6 to the S/P 8 passes through the quencher 10 having a narrow flow channel, thereby being released to the S/P 8. Since there is a pressure loss in the quencher 10, the pressure inside the quencher 10 (inside the SRV exhaust pipe 9) becomes a pressure higher than the outside (W/W space 7a or S/P 8). Therefore, when the differential pressure between a pressure inside the quencher 10 (or inside the SRV exhaust pipe 9 below the S/P water level 81) and a pressure inside the W/W space 7a or the S/P 8 is measured, the presence or absence of steam leakage from the SRV exhaust pipe 9 can be determined.

FIG. 5 is a flowchart illustrating an operation of the atomic power plant of the second embodiment. The same reference sign of step will be applied to processing similar to that of the first embodiment, and overlapping description will be omitted.

As illustrated in FIG. 5, in Step S31, the SRV controller 13 determines whether or not a predetermined time 2 has elapsed. The predetermined time 2 can be set to be shorter than the predetermined time 1 of the first embodiment. In a case where it is determined that the predetermined time 2 has not elapsed (No in S31), the SRV controller 13 repeats the processing of Step S31. In a case where it is determined that the predetermined time 2 has elapsed (Yes in S31), the procedure proceeds to Step S41.

In Step S41, the SRV controller 13 causes the differential pressure measuring instrument 18A to measure a differential pressure ΔP, and the SRV controller 13 receives the measured differential pressure ΔP via the differential pressure measurement value signal line 19.

In Step S51, the SRV controller 13 determines whether or not the measured differential pressure ΔP is equal to or smaller than a ΔPcrit (predetermined threshold value). In a case where it is determined that the differential pressure ΔP is not equal to or smaller than the ΔPcrit (No in S51), the SRV controller 13 returns to Step S20. In a case where it is determined that the differential pressure ΔP is equal to or smaller than the ΔPcrit (Yes in S51), the procedure proceeds to Step S60.

Generally, the propagation of pressure is fast compared to the propagation of temperature. Therefore, when such a system is provided, a steam leakage from the SRV exhaust pipe 9 can be detected at an early stage. Here, as the outside pressure, the pressure in the W/W space 7a or the S/P 8 is postulated. However, in a case where deterioration of the accuracy of determination can be tolerated, the pressure in the D/W 5 may be adopted as the outside pressure.

The position of measuring the pressure inside the SRV exhaust pipe 9 is set inside the quencher 10 (or inside below the S/P water level 81) because similar to the first embodiment, because it is particularly severe from the viewpoint of the rate of rise of the pressure in the PCV 1 in a case where steam leaks from the SRV exhaust pipe 9 in the W/W space 7a (above the S/P water level 81).

The pressure inside the SRV exhaust pipe 9 below the S/P water level 81 is approximately equal to the pressure in the W/W space 7a or the S/P 8 until the SRV 6 is opened (actually, the pressures are slightly different from each other depending on the weight of water above the measuring position, that is, the water head). When the SRV 6 is opened and steam is released, the inside of the SRV exhaust pipe 9 is filled with the steam released from the RPV 3 to the SRV 6. Therefore, when there is no steam leakage from the SRV exhaust pipe 9, the pressure inside the SRV exhaust pipe 9 rises. Meanwhile, in circumstances where an amount of steam leaks from the SRV exhaust pipe 9 such that steam does not reach the S/P 8, the pressure hardly rises at a position below the place where the steam leaks. Thus, when the differential pressure between the pressure inside the SRV exhaust pipe 9 below the S/P water level 81 and the pressure inside the W/W space 7a or the S/P 8 is measured, the presence or absence of steam leakage can be determined. Specifically, in a case where the differential pressure measured by the differential pressure measuring instrument 18A (case where the pressure inside the SRV exhaust pipe 9 is higher than the pressure in the W/W space 7a) is equal to or smaller than the predetermined threshold value ΔPcrit, it is determined that there is a steam leakage.

The ΔPcrit varies depending on the design of the SRV exhaust pipe 9 or the quencher 10. However, for example, in a case where the depth of water in the S/P 8 (difference between the S/P water level 81 and the height of the exit of the quencher 10) is 5 m, the ΔPcrit may be set to equal to or greater than 50 kPa as the pressure for extruding water accumulated inside the SRV exhaust pipe 9 at the initial stage and causing the steam to flow.

In this manner, in a case where it is determined that there is a steam leakage in the SRV exhaust pipe 9, based on the result measured by the differential pressure measuring instrument 18A, a signal for closing the SRV 6 and a signal for prohibiting the SRV 6 from being opened are transmitted, and controlling is performed such that the SRV 6 connected to the SRV exhaust pipe 9 having a steam leakage is not opened. Normally, multiple systems of SRV 6 are installed. In addition, similar to the first embodiment, the present embodiment may be applied to only the SRV 6 having the high priority.

The second embodiment having such a configuration includes the PCV 1, the RPV 3, the main steam line 4, at least two or more SRVs 6, the S/P 8, the SRV exhaust pipe 9 in which one end is connected to each of the SRVs 6 and the other end is connected to the quencher 10 below the S/P water level 81, the differential pressure measuring instrument 18A which measures the differential pressure ΔP obtained by subtracting the pressure in the W/W space 7a inside the PCV 1 from the pressure inside the SRV exhaust pipe 9 below the S/P water level 81, and the SRV controller 13 which controls opening and closing of the SRV 6. After a lapse of the predetermined time 2 from when the SRV 6 is opened, in a case where it is determined that the differential pressure ΔP detected by the differential pressure measuring instrument 18A is equal to or smaller than the ΔPcrit (predetermined threshold value), the SRV controller 13 causes the SRV 6 to which the differential pressure measuring instrument 18A detecting the differential pressure ΔP equal to or smaller than the predetermined threshold value leads, to be closed and to be prohibited from being opened. Accordingly, it is favorable when the differential pressure measuring instrument 18A including the two differential pressure conduits (first differential pressure conduit 181 and second differential pressure conduit 182) is connected only. Therefore, the embodiment can be applied to reactors including existing reactors through a simple method. In addition, in a case where an occurrence of a steam leakage from the SRV exhaust pipe 9 is detected, the SRV 6 is closed and is prohibited from being opened. Accordingly, the pressure in the RPV 3 can be restrained from excessively rising.

In the second embodiment, description has been given with reference to the example of a case where the first differential pressure conduit 181 is connected to the inside of the SRV exhaust pipe 9 below the S/P water level 81 and the second differential pressure conduit 182 is connected to the W/W space 7a. However, the embodiment is not limited thereto. The position where the first differential pressure conduit 181 is connected may be present inside the quencher 10, and the position where the second differential pressure conduit 182 is connected may be present inside the D/W 5 or inside the S/P 8.

Third Embodiment

FIG. 6 is a schematic configuration diagram illustrating an atomic power plant of the third embodiment. FIG. 7 is a partially enlarged cross-sectional view of FIG. 6. FIG. 8 is a flow chart illustrating an operation of the atomic power plant of the third embodiment. The third embodiment corresponds to the configuration of Claim 3 in Claims.

As illustrated in FIG. 6, an atomic power plant 100C of the third embodiment is different from those of the first embodiment and the second embodiment in that the measurement means for detecting a steam leakage from the SRV exhaust pipe 9 is changed.

In FIG. 6, a differential pressure measuring instrument 18B similar to that of the second embodiment is adopted as means for detecting a steam leakage from the SRV exhaust pipe 9. However, the differential pressure measuring instrument 18B is different therefrom in that the differential pressure measuring instrument 18B is the difference between the pressures at two points inside the quencher 10 on the downstream side of the SRV exhaust pipe 9 below the S/P water level 81. It is favorable that the two points are present on the downstream side of the SRV exhaust pipe 9 below the S/P water level 81. The difference between the pressures at two points inside the SRV exhaust pipe 9 where a differential pressure is generated may be measured.

In other words, a pressure loss (differential pressure ΔP) occurs in the SRV exhaust pipe 9 and the quencher 10 when steam flows. On the assumption that the flow of steam is turbulence, the pressure loss (differential pressure ΔP) is normally proportional to the product of the square of the flow rate of steam ($u^2$) and the steam density (ρ) ($\Delta P \propto u^2 \times \rho$). Thus, since the steam density (ρ) is a fixed value, the presence or absence of a flow of steam can be determined by measuring the pressure loss (differential pressure ΔP). In order to more accurately evaluate the flow rate, as illustrated in FIG. 6, it is desirable that an orifice 20 of which the inside is partially narrowed is installed on a passage where steam passes through so as to measure the differential pressure ΔP between before and after the orifice 20.

As illustrated in FIG. 7, the orifice 20 is provided in the cylinder 10a of the quencher 10. The orifice 20 has a penetration hole (reducing hole) 22b smaller than the inner diameter (diameter) of the SRV exhaust pipe 9 at the center of a disk 22a in the radial direction. The orifice 20 is positioned on the upstream side of the branch pipe 10b.

Two differential pressure conduits (first differential pressure conduit 183 and second differential pressure conduit 184) are connected to the differential pressure measuring instrument 18B. The first differential pressure conduit 183 is connected to a space 10s of the cylinder 10a on the downstream side of the orifice 20. The second differential pressure conduit 184 is connected to a space 10t of the cylinder 10a on the upstream side of the orifice 20.

Due to the configuration including such a differential pressure measuring instrument 18B, the presence or absence of a flow of steam and the flow rate of steam can be more directly evaluated and the quantity of steam leakage from the SRV exhaust pipe 9 can also be evaluated. The steam density (ρ) is inevitably a positive value. When the flow rate (u) is greater than zero, the pressure loss (differential pressure ΔP) becomes greater than zero. Thus, the flow rate can be obtained by measuring the differential pressure (ΔP).

Specifically, when a value of the differential pressure ΔP measured inside the quencher 10 is greater than zero, it is possible to determine that the SRV exhaust pipe 9 is sound (no leak). However, actually, the threshold value of the differential pressure to be determined needs to be set in consideration of a measurement error and the like of the differential pressure measuring instrument 18B.

In addition, the quantity of steam leakage from the SRV exhaust pipe 9 can also be evaluated through the above-referenced expression ($\Delta P \propto u^2 \times \rho$) by adopting the orifice 20. When the SRV 6 is opened, the quantity of steam coming out from the orifice 20 is obtained at the time of design. Therefore, in a case where there is a difference between the value (flow rate or differential pressure) at the time of design and the value (flow rate or differential pressure) obtained through the above-referenced expression, it is possible to detect that steam leaks from the SRV exhaust pipe 9. In a case where the difference is significant, it is possible to determine that an amount of steam leaks from the SRV exhaust pipe 9. In a case where the difference is small, it is possible to determine that a steam leakage from the SRV exhaust pipe 9 is insignificant. In this manner, it is possible to calculate whether the quantity of leakage is almost zero or the leakage is significant. For example, it is possible to perform controlling such that the SRV 6 is not closed and is not prohibited from being opened in a case where the quantity of steam leakage is insignificant, and the SRV 6 is closed and is prohibited from being opened only in a case where the quantity of steam leakage is significant.

Subsequently, an operation of the atomic power plant 100C will be described with reference to FIG. 8. The same reference sign of step will be applied to processing similar to that of the second embodiment, and overlapping description will be omitted.

As illustrated in FIG. 8, in Step S52, the SRV controller 13 determines whether or not the differential pressure ΔP measured by the differential pressure measuring instrument 18B in Step S41 is equal to or smaller than the ΔP1crit (predetermined threshold value). The ΔP1crit is set in a manner similar to that of the ΔPcrit. The ΔP1crit is set to a threshold value (differential pressure) corresponding to the quantity of leakage in which a leakage is tolerated. In a case where it is determined that the differential pressure ΔP is not equal to or smaller than the ΔP1crit (No in S52), the SRV controller 13 returns to Step S20. In a case where it is determined that the differential pressure ΔP is equal to or smaller than the ΔP1crit (Yes in S52), the procedure proceeds to Step S53.

In Step S53, the SRV controller 13 further determines whether or not the differential pressure ΔP measured by the differential pressure measuring instrument 18B in Step S31 is equal to or smaller than the ΔP2crit. The ΔP2crit is set to a threshold value smaller than the ΔP1crit. In a case where it is determined that the differential pressure ΔP is not equal to or smaller than the ΔP2crit (No in S53), the SRV controller 13 returns to Step S20. In a case where it is determined that the differential pressure ΔP is equal to or smaller than the ΔP2crit (Yes in S53), the procedure proceeds to Step S60 and controlling is performed such that the SRV 6 is closed and is prohibited from being opened.

FIG. 9 is a cross-sectional view in a case of measuring a differential pressure in a configuration having no orifice.

As illustrated in FIG. 9, even in a configuration in which the orifice 20 is not included in the quencher 10 (refer to FIG. 7), the flow rate (u) of steam can be evaluated. Therefore, installation of the orifice 20 is not essential. In such a case, in two differential pressure conduits of a differential pressure measuring instrument 18C, a first differential pressure conduit 185 is connected to the inside of the cylinder 10a of the quencher 10, and a second differential pressure conduit 186 is connected to the inside of the SRV exhaust pipe 9.

The third embodiment having such a configuration includes the PCV 1, the RPV 3, the main steam line 4, at least two or more SRVs, the S/P 8, the SRV exhaust pipe 9 in which one end is connected to each of the SRVs 6 and the other end is connected to the quencher 10 below the S/P water level 81, the differential pressure measuring instruments 18B and 18C which measure pressures on the downstream side of the SRV exhaust pipe 9 below the S/P water level 81, and the SRV controller 13 which controls opening and closing of the SRV 6. After a lapse of the predetermined time 2 from when the SRV 6 is opened, in a case where it is determined that the values of the differential pressures detected by the differential pressure measuring instruments 18B and 18C are equal to or smaller than the predetermined threshold value (ΔP2crit), the SRV controller 13 causes the SRV 6 to which the differential pressure measuring instruments 18B and 18C detecting the differential pressures equal to or smaller than the predetermined threshold value leads, to be closed and to be prohibited from being opened. Accordingly, it is favorable when the differential pressure measuring instruments 18B and 18C including two differential pressure conduits (first differential pressure conduits 183 and 185, and second differential pressure conduits 184 and 186) are connected only. Therefore, the embodiment can be applied to reactors including existing reactors through a simple method. In addition, in a case where an occurrence of a steam leakage from the SRV exhaust pipe 9 is detected, the SRV 6 is closed and is prohibited from being opened. Accordingly, the pressure in the RPV 3 can be restrained from excessively rising.

In addition, in the third embodiment, the orifice 20 is provided inside the quencher 10, and the differential pressure measuring instrument 18B is configured so as to measure the differential pressure between before and after the orifice 20. Accordingly, the magnitude of the quantity of steam leakage can be measured, and opening and closing of the SRV 6 can be performed in accordance with the quantity of steam leakage.

Similar to the first embodiment and the second embodiment, the third embodiment may be applied to only the SRV 6 having the high priority.

Fourth Embodiment

FIG. 10 is a schematic configuration diagram illustrating an atomic power plant of a fourth embodiment. The fourth embodiment corresponds to the configuration of Claim 5 in Claims.

An atomic power plant 100D of the fourth embodiment is different from the first embodiment and the third embodiment in that the measurement means for detecting a steam leakage from the SRV exhaust pipe 9 is changed.

As illustrated in FIG. 10, a pressure P inside the quencher 10 is measured by a pressure measuring instrument 21 serving as the means for detecting a steam leakage from the SRV exhaust pipe 9. A pressure conduit 211 is connected to the inside of the quencher 10. A signal measured by the pressure measuring instrument 21 is input to the SRV controller 13 through a pressure measurement value signal line 22.

In the second embodiment described above, the differential pressure ΔP between the W/W space 7a and the inside of the SRV exhaust pipe 9 below the S/P water level 81 (or the differential pressure ΔP between the inside of the S/P 8 and the inside of the SRV exhaust pipe 9 below the S/P water level 81) is measured. However, generally, the pressure in the W/W space 7a or the S/P 8 is extremely low compared to the pressure in the reactor. Therefore, a steam leakage from the SRV exhaust pipe 9 can be detected by only measuring the pressure P inside the quencher 10 (or inside the SRV exhaust pipe 9 below the S/P water level 81).

Specifically, the pressure in the W/W space 7a or the pressure in the S/P 8 varies depending on the design. However, for example, the maximum usage pressure is set to 0.4 MPa or the like. When the pressure inside the SRV exhaust pipe 9 below the S/P water level 81 or the pressure inside the quencher 10 becomes greater than the design pressure, it is possible to determine that the SRV exhaust pipe 9 is sound.

FIG. 11 is a flow chart illustrating an operation of the atomic power plant of the fourth embodiment.

As illustrated in FIG. 11, in Step S31, the SRV controller 13 determines whether or not the predetermined time 2 has elapsed. The predetermined time 2 is suitably set in accordance with the length of the SRV exhaust pipe 9. For example, the predetermined time 2 is set to a time shorter than 10 seconds. In a case where it is determined that the predetermined time 2 has not elapsed (No in S31), the SRV controller 13 repeats the processing of Step S31. In a case where it is determined that the predetermined time 2 has elapsed (Yes in S31), the procedure proceeds to Step S42.

In Step S42, the SRV controller 13 measures the pressure P of a fluid flowing inside the quencher 10 by the pressure measuring instrument 21. The SRV controller 13 receives the measured pressure P via the pressure measurement value signal 2.

In Step S54, the SRV controller 13 determines whether or not the pressure P is equal to or smaller than the Pcrit (predetermined threshold value). In a case where it is determined that the pressure P is not equal to or greater than the Pcrit (No in S54), the SRV controller 13 returns to Step S20. In a case where it is determined that the pressure P is equal to or greater than the Pcrit (Yes in S54), the procedure proceeds to Step S60.

According to the fourth embodiment having such a configuration, compared to the second embodiment and the third embodiment, piping or wiring of the measuring instrument is lessened (when measuring a differential pressure, two differential pressure conduits are required to perform measurement at one point, but when measuring a pressure, one pressure conduit or one signal line drawn out from a pressure sensor is required only). Therefore, it is possible to raise the possibility of installation even at a place where piping or wiring is unlikely to be drawn out, and thus, the installation cost can also be reduced. In addition, in a case where an occurrence of a steam leakage from the SRV exhaust pipe 9 is detected (Yes in S54), the SRV 6 is closed and is prohibited from being opened. Accordingly, the pressure in the RPV 3 can be restrained from excessively rising.

The present invention is not limited to the embodiments described above and can be suitably changed within the scope of Claims with no change. For example, in the first embodiment to the fourth embodiment, description has been given with reference to the example of the configuration in which the quencher 10 is attached to the tip of the SRV exhaust pipe 9. However, the configuration may not include the quencher 10 and the tip of the SRV exhaust pipe 9 may be open toward the S/P 8.

REFERENCE SIGNS LIST

1 primary containment vessel (PCV)
2 core
3 reactor pressure vessel (RPV)
4 main steam line
5 drywell (D/W)
6 steam safety relief valve (SRV)
7 wetwell (W/W)
8 pressure suppression pool (S/P)
81 pressure suppression pool water level (S/P water level)
9 SRV exhaust pipe
10 quencher
11 vent pipe
12 temperature measuring instrument
13 SRV controller
14 scram signal line
15 SRV-open signal line
16 temperature measurement value signal line
17 SRV-close signal line
18A, 18B, 18C differential pressure measuring instrument
19 differential pressure measurement value signal line
20 orifice
21 pressure measuring instrument
22 pressure measurement value signal line
100A, 100B, 100C, 100D atomic power plant
181, 183, 185 first differential pressure conduit
182, 184, 186 second differential pressure conduit
211 pressure conduit

The invention claimed is:
1. An atomic power plant comprising:
a primary containment vessel;
a reactor pressure vessel which is disposed inside the primary containment vessel and internally accommodates a core;
a main steam line which is connected to the reactor pressure vessel and leads to a turbine;
at least two or more steam safety relief valves which are independently connected to the main steam line;
a pressure suppression pool which is provided inside the primary containment vessel;
an exhaust pipe in which one end is connected to each of the steam safety relief valves and the other end is connected to a quencher below a water level of the pressure suppression pool;
a condition detector,
wherein the condition detector is in fluid communication with the at least two or more steam safety relief valves,
wherein the condition detector is associated with a steam safety relief valve of the at least two or more steam safety valves,
wherein the condition detector is configured to detect, from inside the quencher or from inside the exhaust pipe at a location below the water level of the pressure suppression pool, a condition of steam leakage from the exhaust pipe while the steam safety relief valve is open; and
a control unit,
wherein the control unit controls opening and closing of the at least two or more steam safety relief valves,
wherein the control unit is configured to determine while the steam safety relief valve is open, whether a condition of steam leakage is detected by the condition detector after lapse of a predetermined time period from when the steam safety relief valve was opened,
wherein the control unit causes, responsive to a positive determination of a condition of steam leakage, the steam safety relief valve to be closed and to be prohibited from being opened.
2. The atomic power plant according to claim 1,
wherein the condition detector includes a temperature measuring instrument,
wherein the temperature measuring instrument measures a temperature inside the quencher,
wherein the control unit is configured to determine, while the steam safety relief valve is open, whether a temperature detected by the temperature measuring instrument after lapse of the predetermined time period is equal to or smaller than a predetermined threshold value,
wherein, while the steam safety relief valve is open, a temperature inside the quencher being equal to or smaller than the predetermined threshold value is associated with a condition of steam leakage,
wherein the control unit causes, responsive to a positive determination of a detected temperature being equal to or smaller than the predetermined threshold value, the steam safety relief valve to be closed and to be prohibited from being opened.

* * * * *